US012643660B2

(12) United States Patent
Addis et al.

(10) Patent No.: US 12,643,660 B2
(45) Date of Patent: Jun. 2, 2026

(54) SYSTEM AND METHOD FOR RESTRAINING A GALLEY CART WITHIN AN INTERNAL CABIN OF AN AIRCRAFT

(71) Applicant: THE BOEING COMPANY, Arlington, VA (US)

(72) Inventors: Paul Addis, Bothell, WA (US); Justin Tabora, Bothell, WA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 18/809,417

(22) Filed: Aug. 20, 2024

(65) Prior Publication Data

US 2026/0054836 A1    Feb. 26, 2026

(51) Int. Cl.
*B64D 11/00*        (2006.01)
(52) U.S. Cl.
CPC ................................ *B64D 11/0007* (2013.01)
(58) Field of Classification Search
CPC ... B64D 11/04; B64D 11/0007; B62B 3/1404; B62B 2202/67; A47F 10/04
See application file for complete search history.

(56) References Cited

U.S. PATENT DOCUMENTS

| | | | | |
|---|---|---|---|---|
| 10,246,191 | B2 * | 4/2019 | Schliwa ............. | B64D 11/0691 |
| 11,130,575 | B2 * | 9/2021 | Vaninetti ................ | B64D 11/00 |
| 2017/0106983 | A1 * | 4/2017 | Castanos ........... | B64D 11/0691 |
| 2020/0317345 | A1 * | 10/2020 | Bauer .................... | B64D 11/04 |
| 2020/0354060 | A1 * | 11/2020 | Vaninetti ................ | A47B 31/06 |
| 2022/0105975 | A1 * | 4/2022 | Dowty .................. | B64D 11/04 |

* cited by examiner

*Primary Examiner* — Joshua J Michener
*Assistant Examiner* — Cindi M Curry
(74) *Attorney, Agent, or Firm* — Joseph M. Butscher; Carroll, Hoette & Butscher, LLC

(57)        ABSTRACT

A system and a method for restraining a galley cart within an internal cabin of a vehicle include a mounting frame configured to be secured to a wall within the internal cabin, and a cart restrainer moveably coupled to the mounting frame. The cart restrainer is configured to be moved between a stowed position against one or both of the wall or the mounting frame, and a deployed position that is configured to restrain the galley cart against one or both of the wall or the mounting frame.

20 Claims, 10 Drawing Sheets

SYSTEM AND METHOD FOR RESTRAINING A GALLEY CART WITHIN AN INTERNAL CABIN OF AN AIRCRAFT

FIELD OF THE DISCLOSURE

Examples of the present disclosure generally relate to a system and a method for restraining a galley cart within an internal cabin of an aircraft, such as a commercial aircraft.

BACKGROUND OF THE DISCLOSURE

Vehicles such as commercial aircraft are used to transport passengers between various locations. A typical aircraft includes an internal cabin having seats for passengers, one or more galleys, and one or more lavatories.

A galley within an internal cabin of a commercial aircraft includes cart compartments for retaining galley carts. A cart compartment includes a dedicated housing having walls and an upper surface, such as a ledge or countertop. A galley cart can be moved into and out of the compartment.

During a flight, an attendant moves a galley cart (such as a trash cart) to and from locations within the internal cabin and the compartment within the galley. In certain situations, the attendant may determine that positioning the galley cart at a different location may be desirable, such as prior to, during, or after a trash collection process.

However, space is limited within an internal cabin of an aircraft. Further, various locations within an aircraft are unable to secure a galley cart in position.

SUMMARY OF THE DISCLOSURE

A need exists for a system and a method for securing a galley cart in a convenient position within an internal cabin of an aircraft. Further, a need exists for a system and a method for securing a galley cart at a location other than a dedicated compartment within a galley.

With those needs in mind, certain examples of the present disclosure provide a system for restraining a galley cart within an internal cabin of a vehicle. The system includes a mounting frame configured to be secured to a wall within the internal cabin. A cart restrainer is moveably coupled to the mounting frame. The cart restrainer is configured to be moved between a first stowed position against one or both of the wall or the mounting frame, and a first deployed position that is configured to restrain the galley cart against one or both of the wall or the mounting frame.

In at least one example, the vehicle includes a monument that includes the wall. The monument can be a lavatory. The wall can face a cross-aisle within the internal cabin. A flight attendant seat can also be secured to the wall and/or a floor.

In at least one example, the cart restrainer includes a first arm connected to a second arm by a cross bar.

In at least one example, the mounting frame includes one or more restraining clips moveable between a restraining position, in which the restraining clips restrain the cart restrainer in the first stowed position, and a release position, in which the cart restrainer can be moved between the first stowed position and the first deployed position.

In at least one example, the system also includes a shelf moveably coupled to the mounting frame. The shelf is configured to be moved between a second stowed position against one or both of the wall or the mounting frame, and a second deployed position that is configured to allow items to be supported on the shelf. As a further example, the cart restrainer and the shelf are independently moveable.

In at least one example, the mounting frame includes one or more restraining clips moveable between a restraining position, in which the restraining clips restrain the shelf in the second stowed position, and a release position, in which the shelf can be moved between the second stowed position and the second deployed position.

The shelf can include one or more cart holding arms and/or one or more cart holding paddles.

In at least one example, lateral support arms are moveably coupled to the shelf and the mounting frame.

The mounting frame can include a cover shroud at a lower end, and/or a bumper.

Certain examples of the present disclosure provide a method including moving the cart restrainer between a first stowed position against one or both of the wall or the mounting frame, and a first deployed position that is configured to restrain the galley cart against one or both of the wall or the mounting frame. In at least one example, the method also includes moving the shelf between a second stowed position against one or both of the wall or the mounting frame, and a second deployed position that is configured to allow items to be supported on the shelf.

Certain examples of the present disclosure provide a vehicle, such as an aircraft, which includes a system for restraining a galley cart, as described herein.

DETAILED DESCRIPTION OF THE DISCLOSURE

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition can include additional elements not having that condition.

Figure 1:
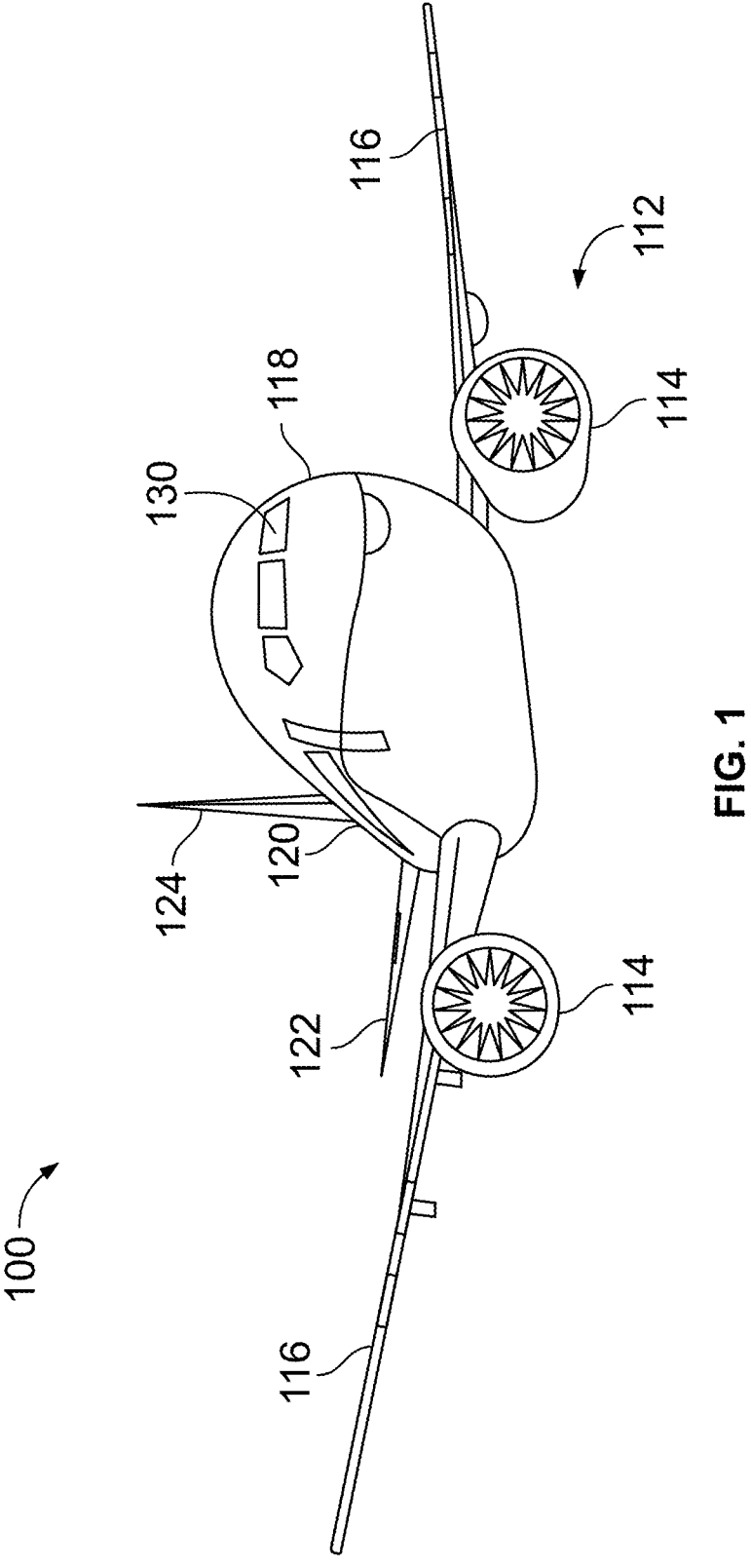
FIG. 1 illustrates a perspective front view of an aircraft, according to an example of the present disclosure.

FIG. 1 illustrates a perspective front view of an aircraft 100, according to an example of the present disclosure. The aircraft 100 includes a propulsion system 112 that includes engines 114, for example. Optionally, the propulsion system 112 may include more engines 114 than shown. The engines 114 are carried by wings 116 of the aircraft 100. In other examples, the engines 114 may be carried by a fuselage 118 and/or an empennage 120. The empennage 120 may also support horizontal stabilizers 122 and a vertical stabilizer 124.

The fuselage 118 of the aircraft 100 defines an internal cabin 130, which includes a flight deck or cockpit, one or more work sections (for example, galleys, personnel carry-on baggage areas, and the like), one or more passenger sections (for example, first class, business class, and coach sections), one or more lavatories, and/or the like. As described herein, the aircraft 100 includes a system for restraining a galley cart within the internal cabin. The system differs from a cart compartment having a housing within a galley.

Alternatively, instead of an aircraft, the system and method as described herein can be used with various other vehicles, such as automobiles, buses, locomotives and train cars, watercraft, spacecraft, and the like.

Figure 2:
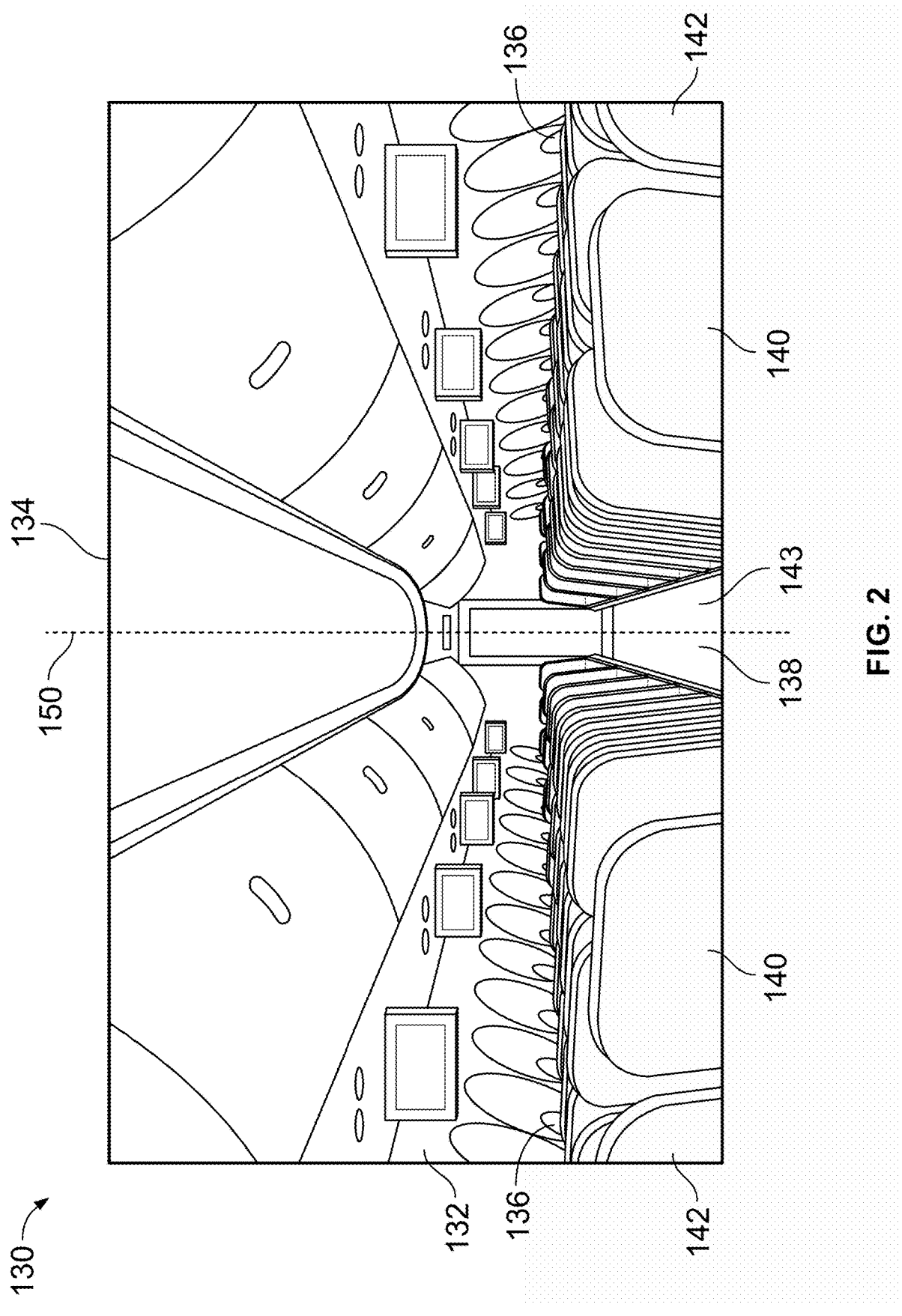
FIG. 2 illustrates a perspective interior view of an internal cabin of an aircraft, according to an example of the present disclosure.

FIG. 2 illustrates a perspective interior view of an internal cabin 130 of an aircraft, according to an example of the present disclosure. The internal cabin 130 includes outboard walls 132 and a ceiling 134. Windows 136 are formed within the outboard walls 132. A floor 138 supports rows of seats 140. As shown in FIG. 2, a row 142 may include three seats 140 on either side of an aisle 143. However, the row 142 may include more or less seats 140 than shown. Additionally, the internal cabin 130 may include more aisles than shown.

As used herein, the term "outboard" means a position that is further away from a central longitudinal plane 150 of the internal cabin 130 as compared to another component. The term "inboard" means a position that is closer to the central longitudinal plane 150 of the internal cabin 130 as compared to another component.

Figure 3:
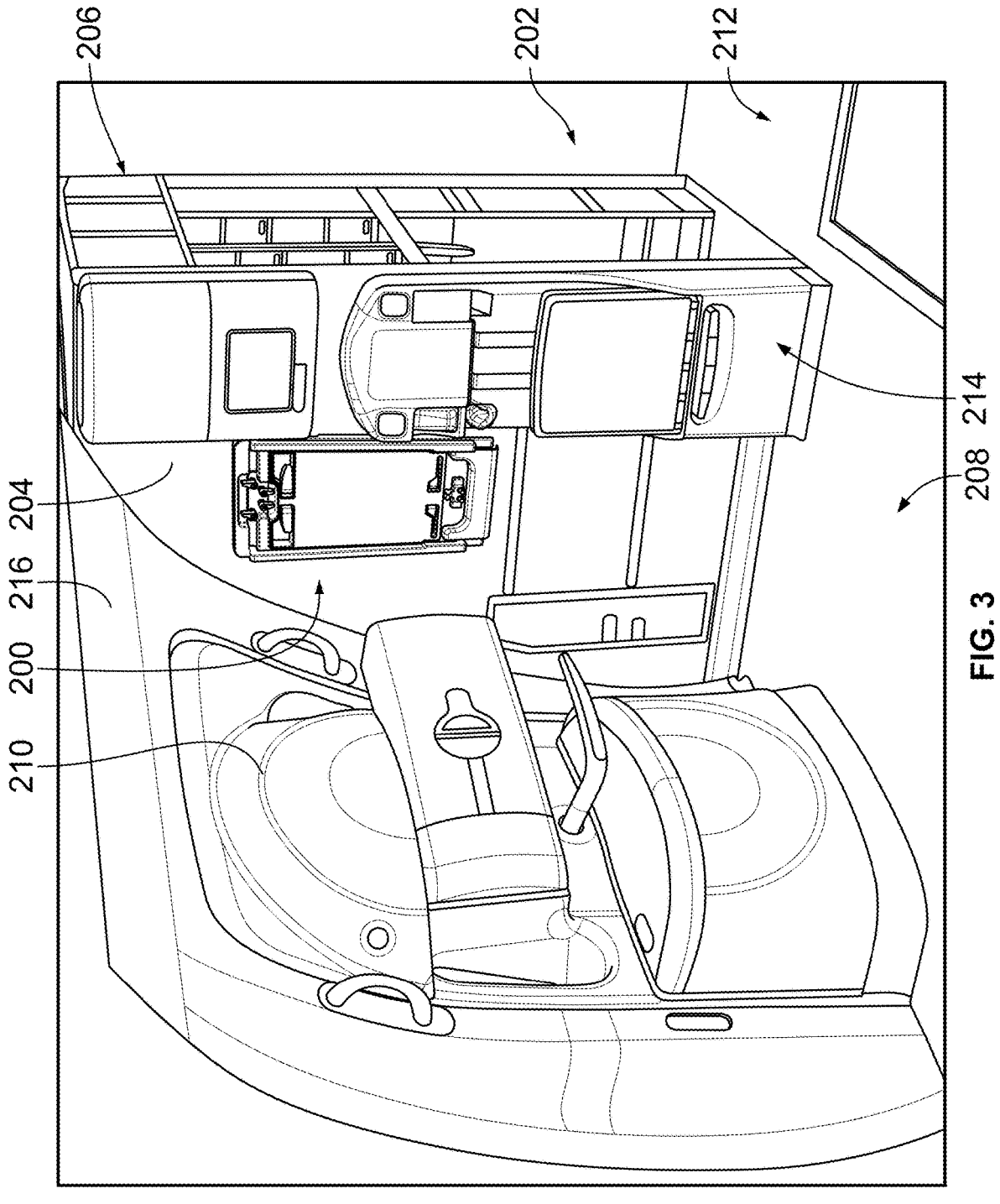
FIG. 3 illustrates a perspective view of a system for restraining a galley cart within an internal cabin of an aircraft, according to an example of the present disclosure.

FIG. 3 illustrates a perspective view of a system 200 for restraining a galley cart within an internal cabin 202 of an aircraft, according to an example of the present disclosure. The internal cabin 202 is an example of the internal cabin 130 shown in FIGS. 1 and 2. The system 200 is secured to a wall 204 of a monument 206, such as a galley. As another example, the monument 206 is a lavatory. As another example, the monument 206 is a closet.

The wall 204 faces a cross-aisle 208, which can be an egress path that leads to an exit door 210 within the internal cabin 202. The cross-aisle 208 intersects an aisle 212, which can be parallel to a longitudinal plane (such as the central longitudinal plane 150 shown in FIG. 2) of the internal cabin 202. The system 200 can be outboard from the aisle 212. Optionally, the system 200 can be inboard from the aisle 212 (such as if the system 200 is between two aisles).

As shown, the system 200 is mounted to the wall 204, which also supports a flight attendant seat 214. That is, the flight attendant seat 214 is also secured to the wall 204 and/or a floor. The system 200 is disposed between an outer wall 216 and the flight attendant seat 214. The system 200 is outboard from the flight attendant seat 214. Optionally, the system 200 can be secured to other walls, which may not also support a flight attendant seat. As another example, the system 200 can be inboard from the flight attendant seat 214.

As shown in FIG. 3, the system 200 is shown in a stowed position. In the stowed position, the system 200 can be recessed into the wall 204. For example, the wall 204 can include a recessed channel that retains the system 200.

Figure 4:
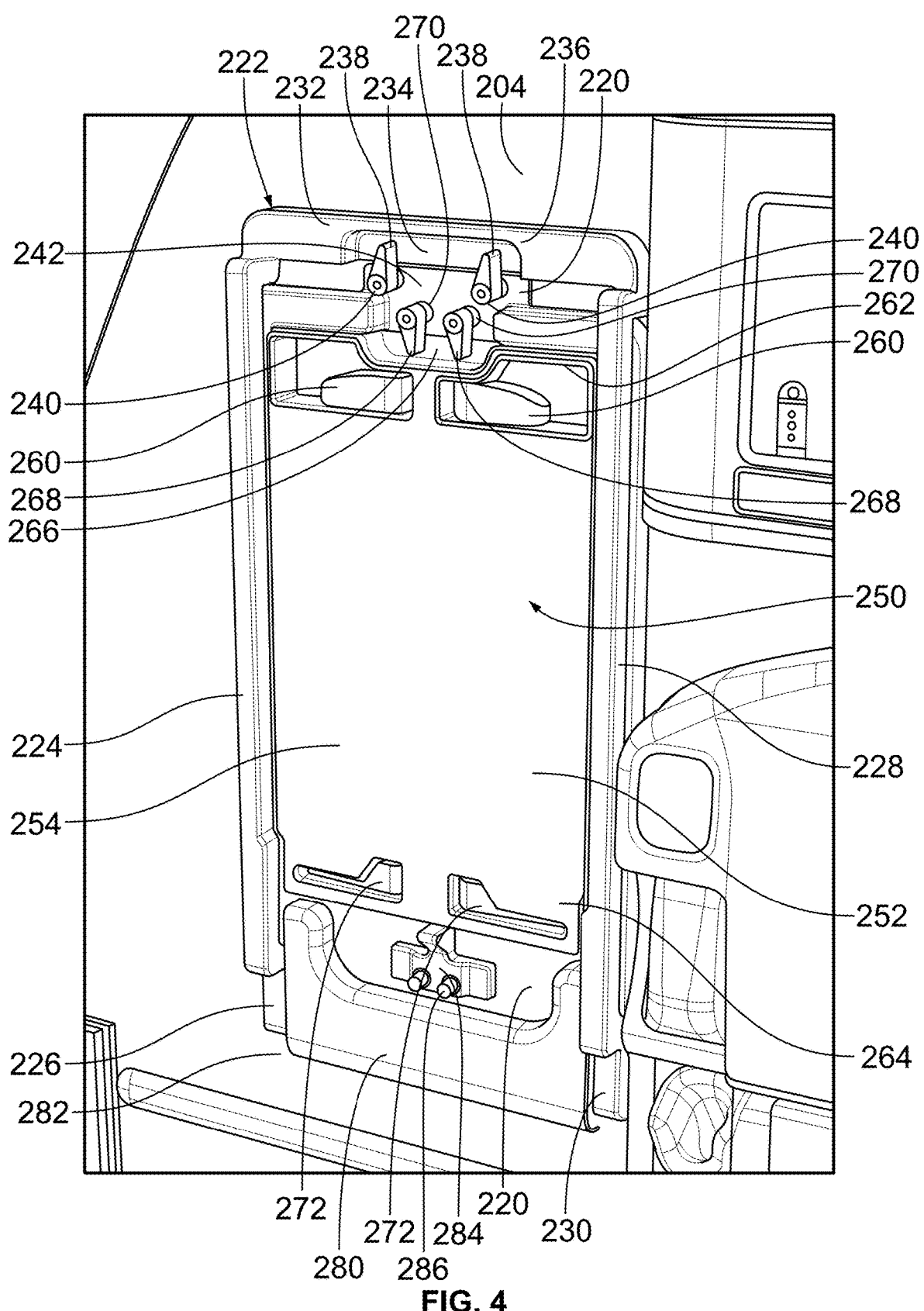
FIG. 4 illustrates a perspective view of the system in a stowed position, according to an example of the present disclosure.
Figure 5:
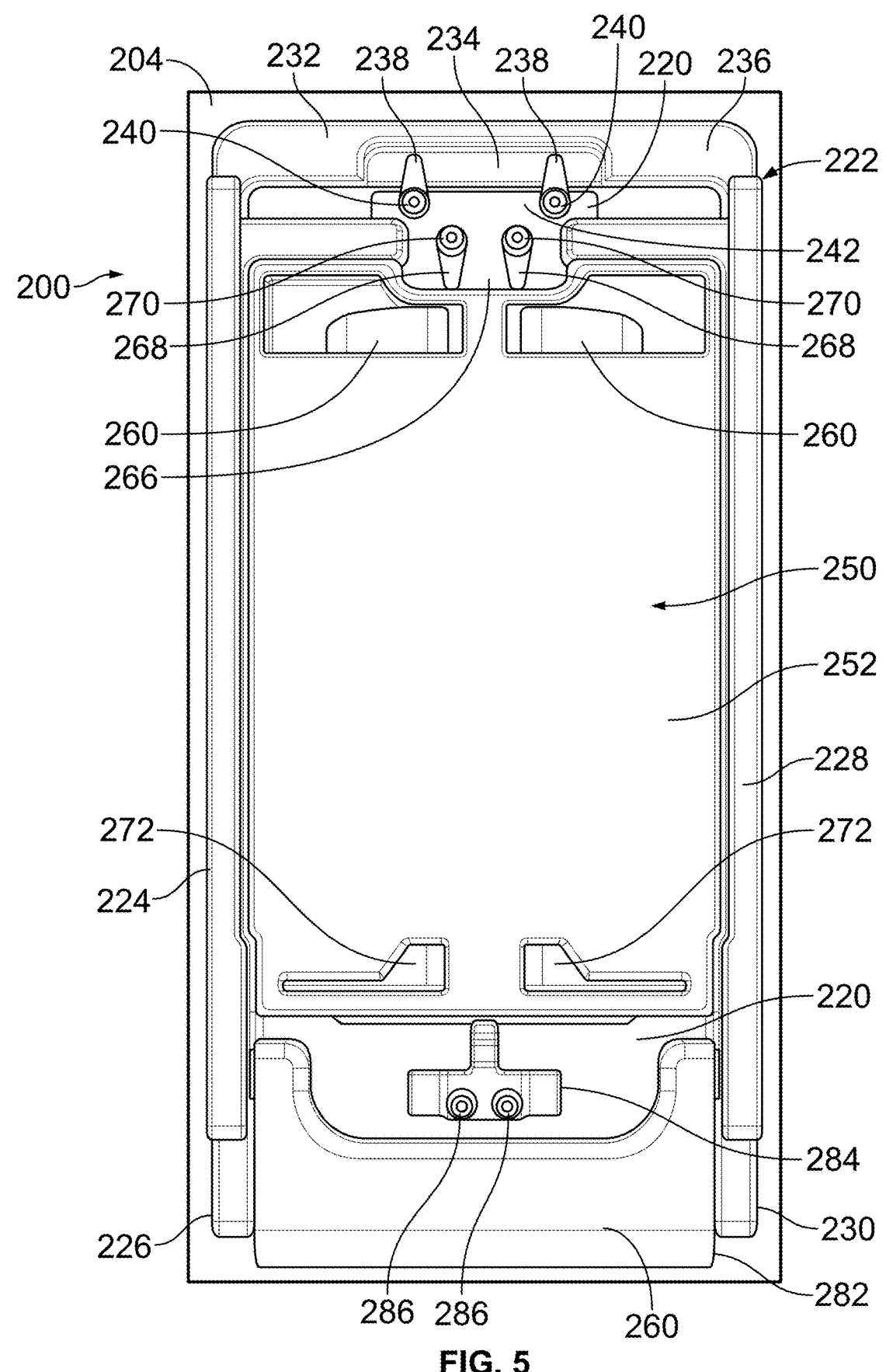
FIG. 5 illustrates a front view of the system in the stowed position.

FIG. 4 illustrates a perspective view of the system 200 in the stowed position, according to an example of the present disclosure. FIG. 5 illustrates a front view of the system 200 in the stowed position. Referring to FIGS. 4 and 5, the system 200 includes a mounting frame 220 that is secured to the wall 204. For example, the mounting frame 220 is secured to the wall 204 through one or more fasteners, adhesives, and/or the like. A cart restrainer 222 is pivotally secured to the mounting frame 220. The cart restrainer 222 is configured to pivot between a stowed position (as shown in FIG. 4) and a deployed position. The cart restrainer 222 includes a first arm 224 pivotally coupled to the mounting frame 220 at a first root 226 (such as via a pivot pin), a second arm 228 pivotally coupled to the mounting frame 220 at a second root 230 (such as via a pivot pin), and a cross bar 232 connecting the first arm 224 and the second arm 228, and which is distally located from the first root 226 and the second root 230. The first arm 224 and the second arm 228 are spaced part from one another. The first arm 224 and the second arm 228 can be parallel to one another, and perpendicular to the cross bar 232. Optionally, one or more of the first arm 224, the second arm 228, and the cross bar 232 can be sized and shaped differently. For example, the first arm 224, the second arm 228, and the cross bar 232 can connect together in a curved, U, and/or horseshoe shape.

The cross bar 232 includes a channel 234 formed in a surface 236. The channel 234 is configured to receive holding ends 238 of restraining clips 240 pivotally secured to a top plate 242 of the mounting frame 220. The restraining clips 240 can be quarter turn clips that are moveable between a restraining position, as shown in FIG. 4, and a release position. In the restraining position, the holding ends 238 hold the cross bar 232, and therefore the cart restrainer 222, in the stowed position. The mounting frame 220 can include more or fewer restraining clips 240 than shown.

The system 200 also includes a shelf 250 pivotally secured to the mounting frame 220, such as via pivot pins. The shelf 250 is configured to move between a stowed position (as shown in FIG. 4) and a deployed position. The shelf 250 and the cart restrainer 222 are independently movable from one another. For example, the cart restrainer 222 can be in a deployed position, while the shelf 250 is in a stowed position. As another example, the cart restrainer 222 can be in the stowed position, while the shelf 250 is in the deployed position. As another example, both the cart restrainer 222 and the shelf 250 can be in stowed positions (as shown in FIG. 4). As another example, both the cart restrainer 222 and the shelf 250 can be in deployed positions.

The shelf 250 includes a planar main body 252 having a surface 254. In the stowed position, the surface 254 is a front surface. In the deployed position, the surface 254 is a bottom surface. The surface 254 is opposite from another surface (hidden from view in FIG. 4), which is parallel to (and can abut against) the wall 204 when the shelf 250 is in the stowed position. When the shelf 250 is in the deployed position, the other surface (opposite from the surface 254) is a top surface.

The shelf 250 includes cart holding arms 260 pivotally coupled to the surface 254 proximate to a first end 262, which is opposite from a second end 264 that pivotally couples to the mounting frame 220. The cart holding arms 260 are movable between a stowed position (as shown in FIG. 4), and a deployed position. The cart holding arms 260 can be quarter turn arms, for example.

The shelf 250 also includes a channel 266 formed in the surface 254 proximate to the top plate 242 of the mounting frame 220. The channel 266 is configured to receive holding ends 268 of restraining clips 270 pivotally secured to the top plate 242 of the mounting frame 220 below the restraining clips 240. The restraining clips 270 can be quarter turn clips that are moveable between a restraining position, as shown in FIG. 4, and a release position. In the restraining position, the holding ends 268 hold the shelf 250 in the stowed position. The mounting frame 220 can include more or fewer restraining clips 270 than shown.

The shelf 250 can also include holding paddles 272 pivotally coupled to the main body 252 proximate to the second end 264. The holding paddles 272 are moveable between stowed positions (as shown in FIG. 4) and deployed positions. A top portion of a galley cart can be restrained between the holding arms 260 in deployed positions and the holding paddles 272 in deployed positions when the shelf 250 is in the deployed position. The shelf 250 can include more or fewer holding arms 260 and holding paddles 272 than shown. For example, the shelf 250 can include the holding arm(s) 260, but not the holding paddle(s) 272. As another example, the shelf 250 can include the holding paddle(s) 272, but not the holding arm(s) 260. In at least one example, the holding paddle(s) 272 and the holding arm(s) 260 can be mechanically linked to move together. Optionally, the shelf 250 may not include either of the holding arms or the holding paddles.

The mounting frame 220 can also include a cover shroud 280 at a lower end 282. The cover shroud 280 can be formed of a resilient material, such as rubber and/or plastic. A bumper 284 (which can include one or more resilient stops 286, such as can be formed of rubber) can also be secured to the mounting frame 220 between the cover shroud 280 and the shelf 250. The cover shroud 280 and the bumper 284 are configured to provide cushioning resistance against a portion of a galley cart. Optionally, the mounting frame 220 may not include the cover shroud 280 and/or the bumper 284.

Figure 6:
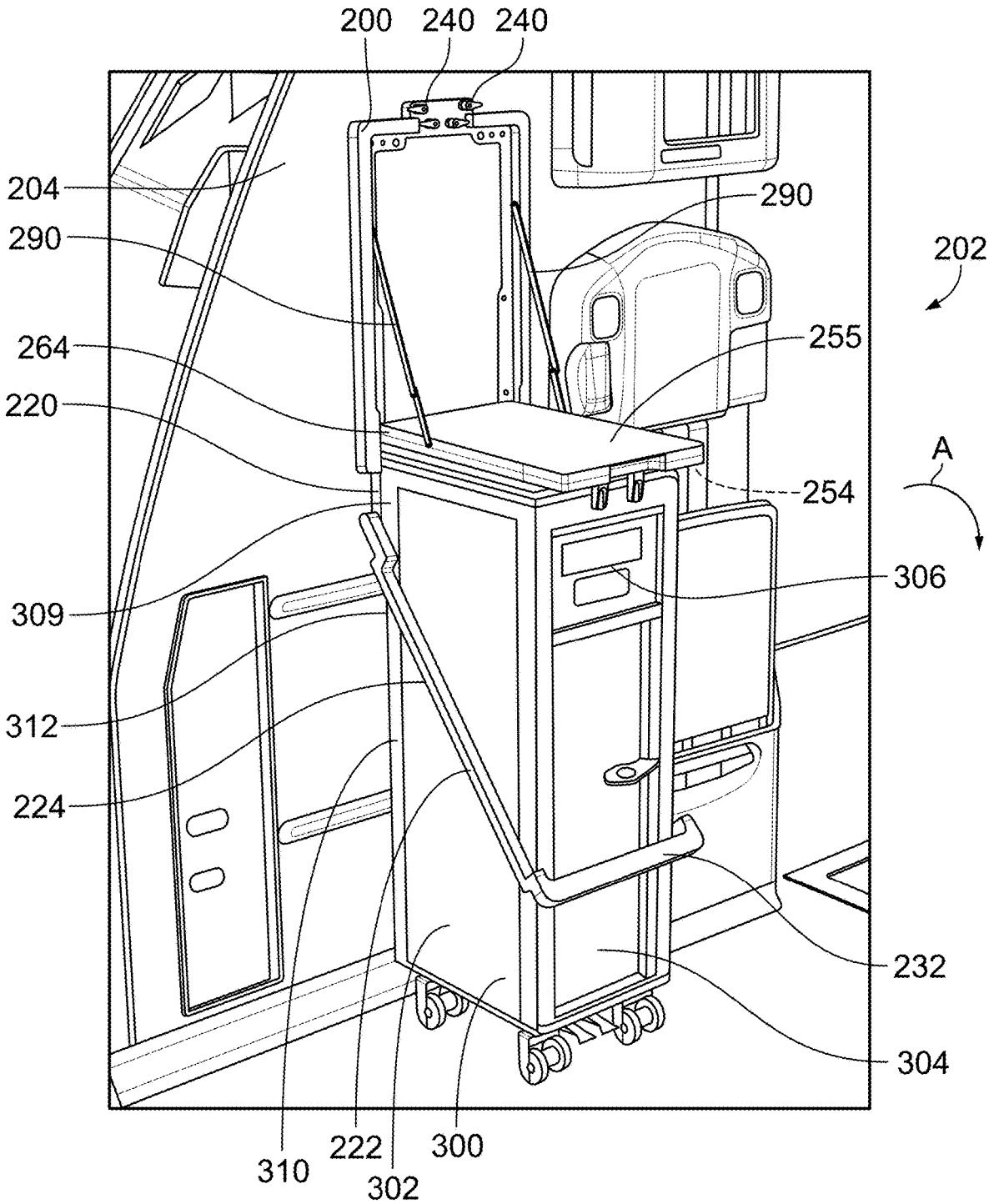
FIG. 6 illustrates a perspective view of the system restraining a galley cart within the internal cabin, according to an example of the present disclosure.

FIG. 6 illustrates a perspective view of the system 200 restraining a galley cart 300 within the internal cabin, according to an example of the present disclosure. The galley cart 300 includes a housing 302 having chambers configured to retain food items, beverages, trash, and/or the like. As an example, the galley cart 300 can be a trash cart dedicated to retaining trash. The housing 302 includes one or more doors 304, drawers 306, and/or the like configured to be opened and closed to selectively expose and close the chambers. The housing 302 is supported on rollers (such as wheels and/or casters) that allow the galley cart 300 to be easily moved within the internal cabin 202. As shown the galley cart 300 is a half-sized galley cart. Optionally, the galley cart 300 can be a full sized galley cart.

Referring to FIGS. 4-6, in order to securely restrain the galley cart 300, a top portion 309 of a rear end 310 of the galley cart 300 is moved against a lower portion of the mounting frame 220. For example, the top portion 309 of the rear end 310 abuts against the cover shroud 280 and/or bumper 284, which cushion impact and protect the galley cart 300 from being scuffed, scratched, or the like. The system 200 is secured to the wall 204 so that the second end 264 of the shelf 250 is spaced apart from, and above a top surface 312 of the galley cart 300. After the galley cart 300 is moved against the mounting frame 220, the restraining clips 240 are pivoted from restraining positions to release positions. As such, the cross bar 232 of the cart restrainer 222 can be grasped, and the cart restrainer 222 can be pivoted downwardly and in front of the galley cart 300 in the direction of arc A. In this manner, the galley cart 300 is restrained between the first arm 224, the second arm 228, the cross bar 232, and the wall 204. The first arm 224 and the second arm 228 can be sized to accommodate half size galley carts and full size galley carts. If restraining a full size galley cart, the cross bar 232 is at a higher position when the cart restrainer is in the deployed position than shown in FIG. 6 (in which a half size galley cart is being restrained).

As noted, the shelf 250 need not be moved from a stowed position into a deployed position when the cart restrainer 222 is the deployed position. However, the shelf 250 can be moved from the stowed position to the deployed position over a top surface 312 of the galley cart 300. When the shelf 250 is in the deployed position, a surface 255 opposite from the surface 254 provides a support surface on which various objects (such as beverages, food items, cellular phones, or the like) can be supported. The system 200 can also include lateral support arms 290 (such as sliding and/or folding arms that connect to the mounting frame 220 and sides of the shelf 250) to secure the shelf 250 in a level position when the shelf 250 is in the deployed position.

The cart holding arms 260 and/or the cart holding paddles 272 can be moved into deployed positions to further restrain the top of the galley cart 300 therebetween. Optionally, the cart holding arms 260 and the cart holding paddles 272 may not be used.

In at least one example, the shelf 250 can be in the deployed position when the cart restrainer 222 is in the stowed position. The shelf 250 can be deployed even if the system 200 is not being used to restrain a galley cart.

Figure 7:
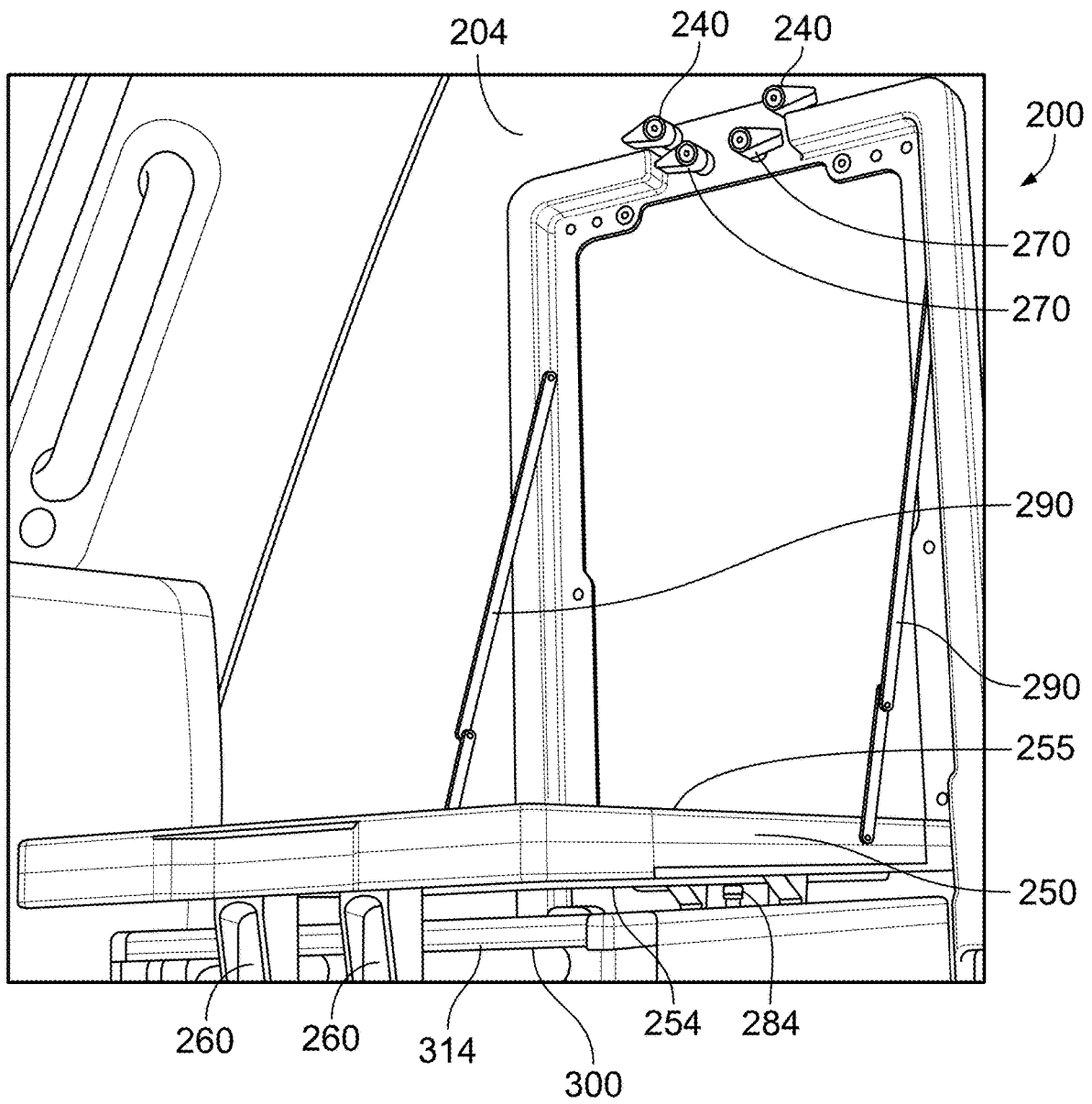
FIG. 7 illustrates a perspective front view of the system having a shelf in a deployed position, according to an example of the present disclosure.

FIG. 7 illustrates a perspective front view of the system 200 having the shelf 250 in a deployed position, according to an example of the present disclosure. As shown in FIG. 7, the restraining clips 240 and 270 are in release positions. The cart holding arms 260 are in deployed positions, which provides a barrier past which the top, front portion 314 of the galley cart 300 is blocked from movement.

Figure 8:
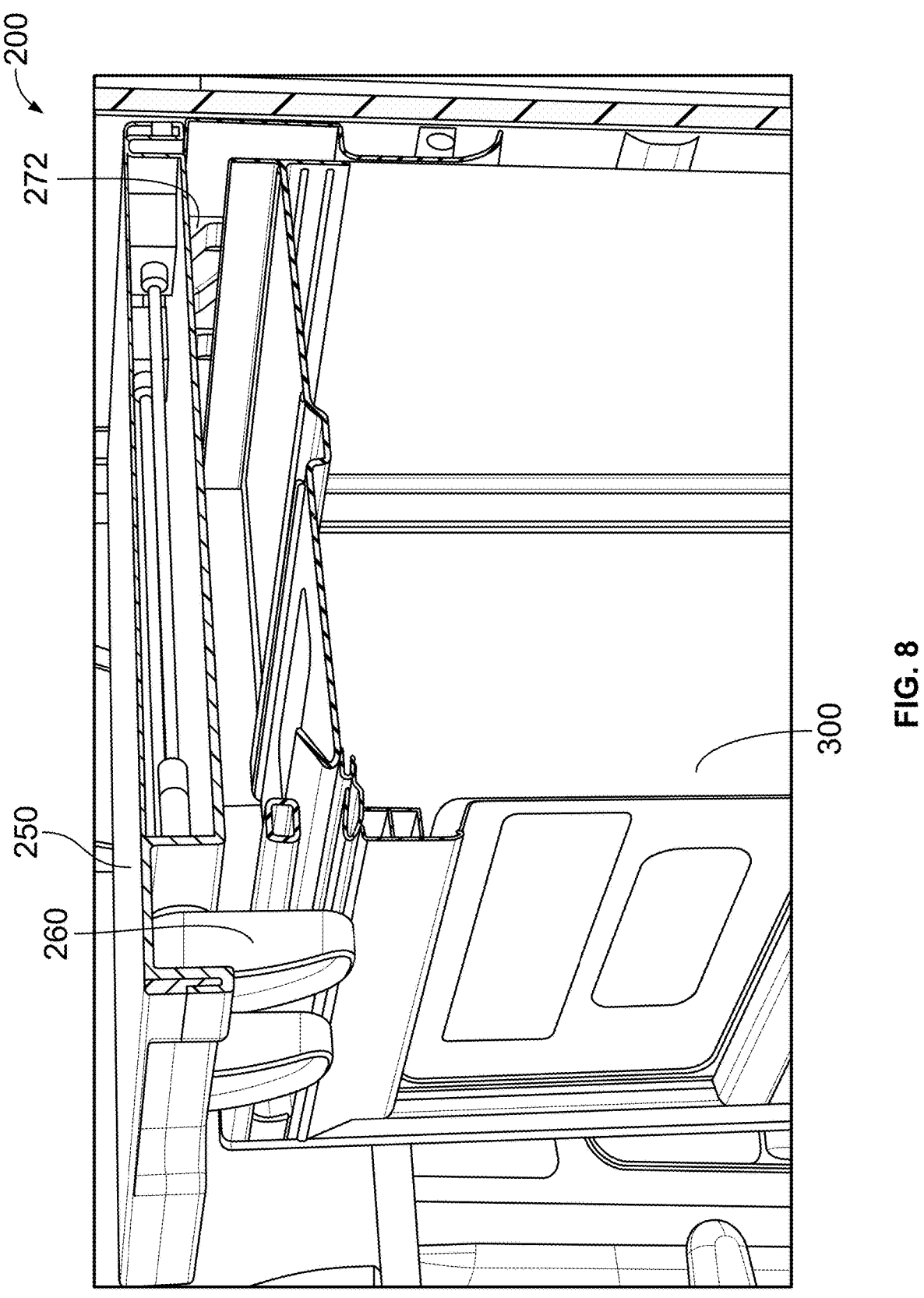
FIG. 8 illustrates a perspective side view of the shelf in the deployed position, according to an example of the present disclosure.

FIG. 8 illustrates a perspective side view of the shelf 250 in the deployed position, according to an example of the present disclosure. As shown, the top of the galley cart 300 is restrained from motion between the cart holding arms 260 in deployed positions, and the cart holding paddles 272 in deployed positions.

Referring to FIGS. 1-8, the system 200 is configured for restraining the galley cart 300 (such as a trash cart) within the internal cabin 202 of a vehicle, such as the aircraft 100. The system 200 includes the mounting frame 220 configured to be secured to the wall 204 within the internal cabin 202. The cart restrainer 222 is moveably coupled to the mounting frame 220. For example, the cart restrainer 222 is pivotally coupled to the mounting frame 220. As another example, the cart restrainer 222 is telescopically coupled to the mounting frame 220. As another example, the cart restrainer 222 is foldably coupled to the mounting frame 220. As another example, the cart restrainer 222 is slidably coupled to the mounting frame 220. As another example, the cart restrainer 222 is elastically coupled to the mounting frame 220 (for example, the cart restrainer 222 can be a resilient rubber strap). The cart restrainer 222 is configured to be moved between a first stowed position against the wall 204 and/or the mounting frame 220, and a first deployed position that is configured to restrain the galley cart 300 against the wall 204 and/or the mounting frame 220.

In at least one example, the system 200 also includes the shelf 250 moveably coupled to the mounting frame 220. The shelf 250 is configured to be moved between a second stowed position against the wall 204 and/or the mounting frame 220, and a second deployed position that is configured to allow items (such as beverages, food items, trays, plates, cellular phones, etc.) to be supported on the shelf 250. In at least one example, the cart restrainer 222 and the shelf 250 are independently moveable. Alternatively, the cart restrainer 222 and the shelf 250 move between the different positions along with one another.

Figure 9:
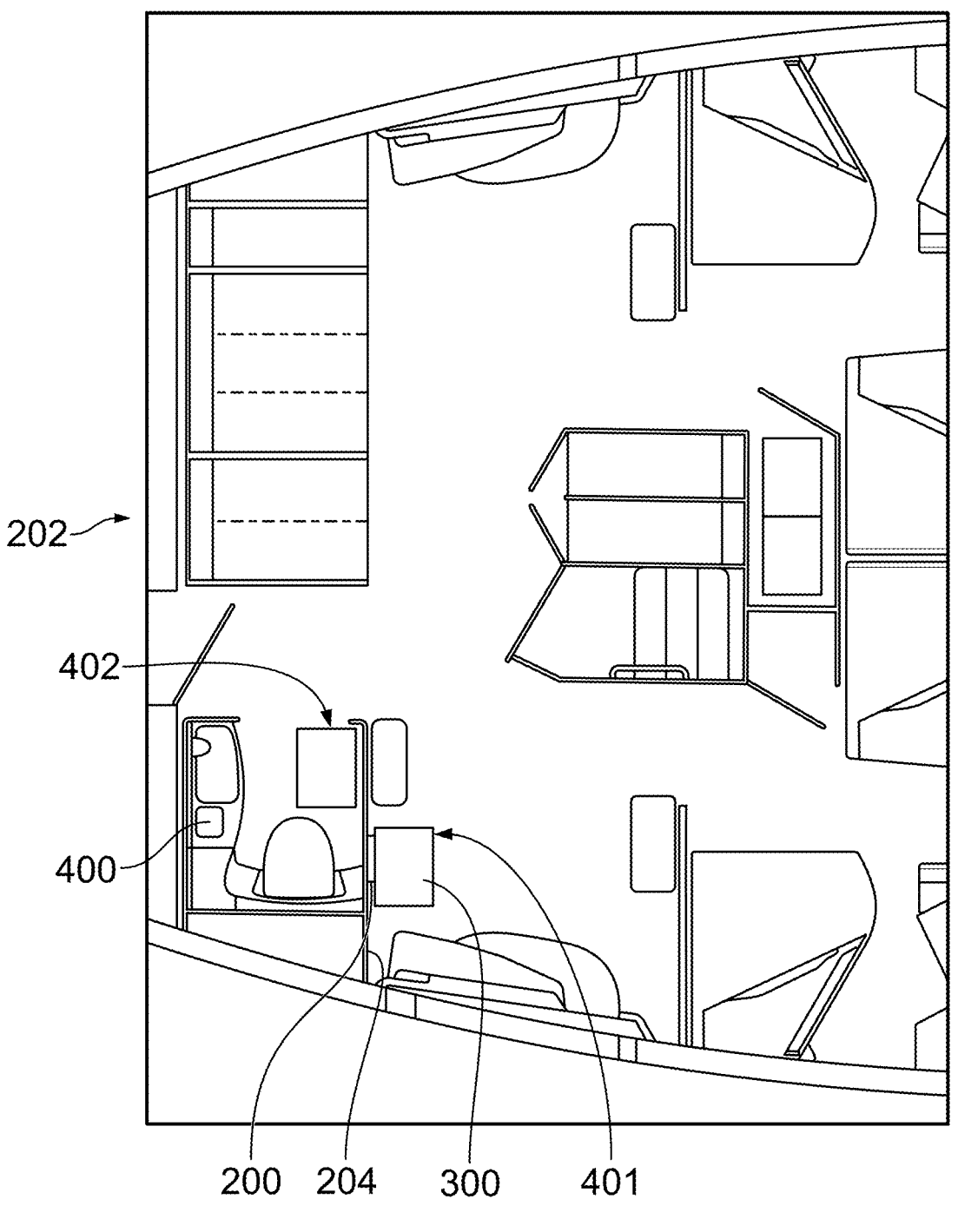
FIG. 9 illustrates a top plan view of a portion of an internal cabin, according to an example of the present disclosure.

FIG. 9 illustrates a top plan view of a portion of the internal cabin 202, according to an example of the present disclosure. As shown, the system 200 is secured to the wall 204 of a monument, which can be a lavatory 400. During a cruise phase, for example, of a flight, the system 200 can be used to restrain the galley cart 300 in position 401. During certain phases of flight, such as take-off and/or landing, the galley cart 300 may be contained within other areas of the internal cabin 202, such as at position 402 within the lavatory 400. The lavatory 400 can include various restraining devices, such as latches, straps, clips, a docking station, and/or the like configured to secure the galley cart 300 at the position 402.

Figure 10:
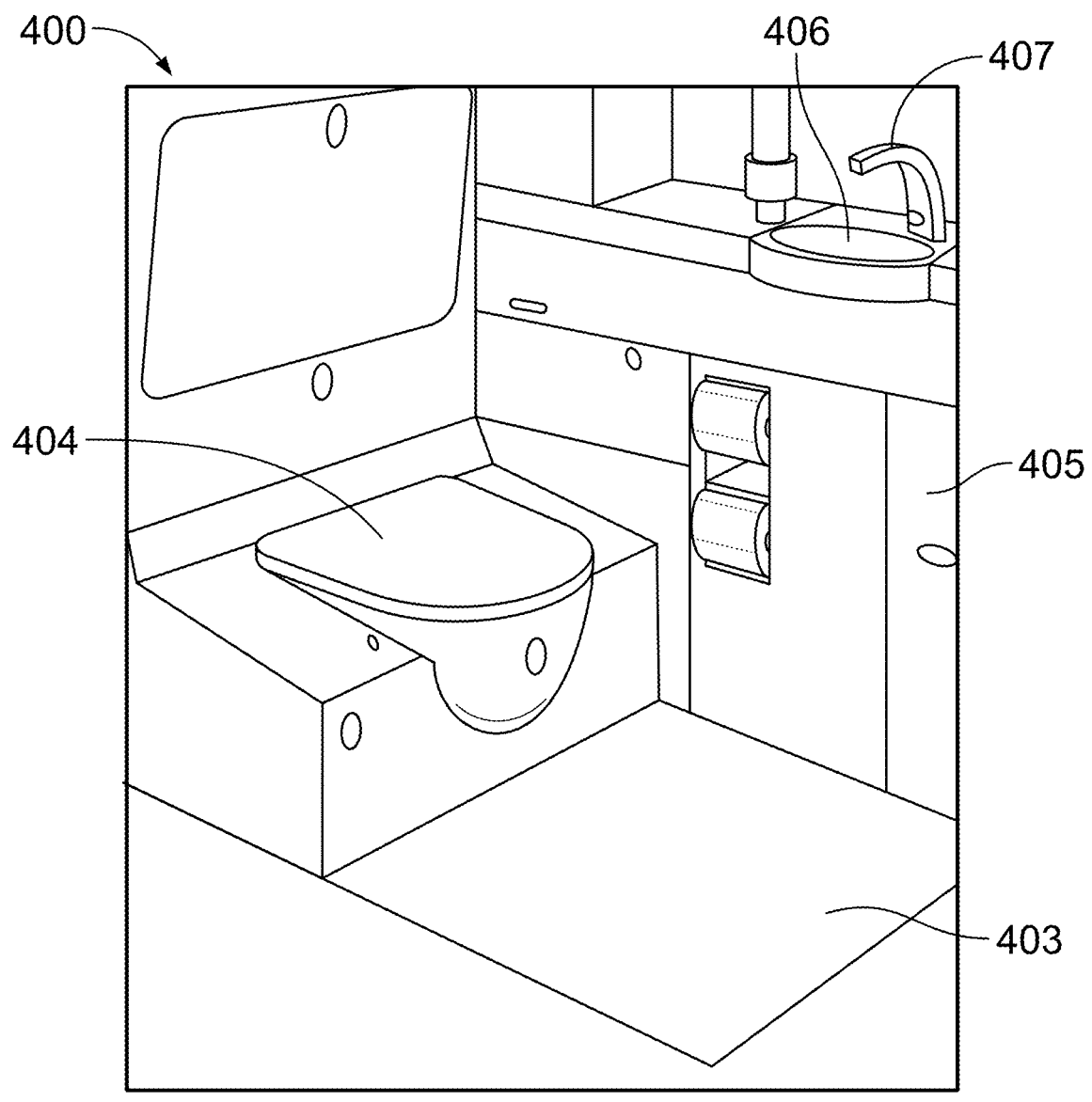
FIG. 10 illustrates an isometric internal view of a lavatory, according to an example of the present disclosure.

FIG. 10 illustrates an isometric internal view of a lavatory 400, according to an example of the present disclosure. The lavatory 400 includes a base floor 403 that supports a toilet 404, one or more cabinets 405, a sink 406 or wash basin, and a faucet 407. The lavatory 400 may be arranged differently than shown. The lavatory 400 may include more or less components than shown. Referring to FIGS. 9 and 10, the lavatory 400 can include one or more restraining devices configured to secure the galley cart 300 at the position 402.

Further, the disclosure includes examples according to the following clauses:

Clause 1. A system for restraining a galley cart within an internal cabin of a vehicle, the system comprising:

a mounting frame configured to be secured to a wall within the internal cabin; and a cart restrainer moveably coupled to the mounting frame, wherein the cart restrainer is configured to be moved between a first stowed position against one or both of the wall or the mounting frame, and a first deployed position that is configured to restrain the galley cart against one or both of the wall or the mounting frame.

Clause 2. The system of Clause 1, wherein the vehicle includes a monument that includes the wall.

Clause 3. The system of Clause 2, wherein the monument is a lavatory.

Clause 4. The system of any of Clauses 1-3, wherein the wall faces a cross-aisle within the internal cabin.

Clause 5. The system of any of Clauses 1-4, wherein a flight attendant seat is also secured to the wall.

Clause 6. The system of any of Clauses 1-5, wherein the cart restrainer comprises a first arm connected to a second arm by a cross bar.

Clause 7. The system of any of Clauses 1-6, wherein the mounting frame comprises one or more restraining clips moveable between a restraining position, in which the restraining clips restrain the cart restrainer in the first stowed position, and a release position, in which the cart restrainer can be moved between the first stowed position and the first deployed position.

Clause 8. The system of any of Clauses 1-7, further comprising a shelf moveably coupled to the mounting frame, wherein the shelf is configured to be moved between a second stowed position against one or both of the wall or the mounting frame, and a second deployed position that is configured to allow items to be supported on the shelf.

Clause 9. The system of Clause 8, wherein the cart restrainer and the shelf are independently moveable.

Clause 10. The system of Clauses 8 or 9, wherein the mounting frame comprises one or more restraining clips moveable between a restraining position, in which the restraining clips restrain the shelf in the second stowed position, and a release position, in which the shelf can be moved between the second stowed position and the second deployed position.

Clause 11. The system of any of Clauses 8-10, wherein the shelf comprises one or both of one or more cart holding arms or one or more cart holding paddles.

Clause 12. The system of any of Clauses 1-11, further comprising lateral support arms moveably coupled to the shelf and the mounting frame.

Clause 13. The system of any of Clauses 1-12, wherein the mounting frame comprises a cover shroud at a lower end.

Clause 14. The system of any of Clauses 1-13, wherein the mounting frame comprises a bumper.

Clause 15. A method for a system for restraining a galley cart within an internal cabin of a vehicle, the system comprising:

a mounting frame secured to a wall within the internal cabin; and a cart restrainer moveably coupled to the mounting frame, the method comprising:

moving the cart restrainer between a first stowed position against one or both of the wall or the mounting frame, and a first deployed position that is configured to restrain the galley cart against one or both of the wall or the mounting frame.

Clause 16. The method of Clause 15, wherein the system further comprises a shelf moveably coupled to the mounting frame, the method further comprising moving the shelf between a second stowed position against one or both of the wall or the mounting frame, and a second deployed position that is configured to allow items to be supported on the shelf.

Clause 17. An aircraft comprising:

an internal cabin;

a monument within the internal cabin, wherein the monument comprises a wall, and wherein the wall faces a cross-aisle within the internal cabin;

a flight attendant seat secured to the wall; and a system for restraining a galley cart within the internal cabin of a vehicle, the system comprising:

a mounting frame secured to the wall within the internal cabin, wherein the mounting frame comprises a cover shroud and a bumper;

a cart restrainer moveably coupled to the mounting frame, wherein the cart restrainer is configured to be moved between a first stowed position against one or both of the wall or the mounting frame, and a first deployed position that is configured to restrain the galley cart against one or both of the wall or the mounting frame; and a shelf moveably coupled to the mounting frame, wherein the shelf is configured to be moved between a second stowed position against one or both of the wall or the mounting frame, and a second deployed position that is configured to allow items to be supported on the shelf, wherein the cart restrainer and the shelf are independently moveable.

Clause 18. The aircraft of Clause 17, wherein the cart restrainer comprises a first arm connected to a second arm by a cross bar.

Clause 19. The aircraft of Clauses 17 or 18, wherein the mounting frame comprises:

one or more first restraining clips moveable between a first restraining position, in which the first restraining clips restrain the cart restrainer in the first stowed position, and a first release position, in which the cart restrainer can be moved between the first stowed position and the first deployed position; and one or more second restraining clips moveable between a second restraining position, in which the second restraining clips restrain the shelf in the second stowed position, and a second release position, in which the shelf can be moved between the second stowed position and the second deployed position.

Clause 20. The aircraft of any of Clauses 17-19, wherein the shelf comprises one or both of one or more cart holding arms or one or more cart holding paddles.

As described herein, examples of the present disclosure provide a system and a method for securing a galley cart in a convenient position within an internal cabin of an aircraft. Further, examples of the present disclosure provide a system and a method for securing a galley cart at a location other than a dedicated compartment within a galley.

While various spatial and directional terms, such as top, bottom, lower, mid, lateral, horizontal, vertical, front and the like can be used to describe embodiments of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) can be used in combination with each other. In addition, many modifications can be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A system for restraining a galley cart within an internal cabin of a vehicle, the system comprising:

a mounting frame configured to be secured to a wall within the internal cabin;

a cart restrainer moveably coupled to the mounting frame, wherein the cart restrainer is configured to be moved between a first stowed position against one or both of the wall or the mounting frame, and a first deployed position that is configured to restrain the galley cart against one or both of the wall or the mounting frame, wherein the cart restrainer comprises:

a first arm pivotally coupled to the mounting frame at a first root;

a second arm pivotally coupled to the mounting frame at a second root, wherein the second arm is spaced apart from the first arm; and a cross bar connecting the first arm and the second arm, wherein the cross bar is distally located from the first root and the second root; and a shelf pivotally coupled to the mounting frame, wherein the shelf is configured to be moved between a second stowed position against one or both of the wall or the mounting frame, and a second deployed position that is configured to allow items to be supported on the shelf, wherein the shelf comprises:

a main body having a first surface, a first end, and a second end opposite from the first end, wherein the second end is pivotally coupled to the mounting frame;

cart holding arms pivotally coupled to the first surface at the first end, wherein the cart holding arms are moveable between a third stowed position and a third deployed position; and holding paddles pivotally coupled to the main body to the first surface at the second end, wherein the holding paddles are moveable between a fourth stowed position and a fourth deployed position, wherein a top portion of galley cart is configured to be restrained between the cart holding arms in the third deployed position and the holding paddles in the fourth deployed position when the shelf is in the second deployed position.

2. The system of claim 1, wherein the vehicle includes a monument that includes the wall.

3. The system of claim 2, wherein the monument is a lavatory.

4. The system of claim 1, wherein the wall faces a cross-aisle within the internal cabin.

5. The system of claim 1, wherein a flight attendant seat is also secured to the wall.

6. The system of claim 1, wherein the mounting frame comprises one or more restraining clips moveable between a restraining position, in which the restraining clips restrain the cart restrainer in the first stowed position, and a release position, in which the cart restrainer can be moved between the first stowed position and the first deployed position.

7. The system of claim 1, wherein the cart restrainer and the shelf are independently moveable.

8. The system of claim 1, wherein the mounting frame comprises one or more restraining clips moveable between a restraining position, in which the restraining clips restrain the shelf in the second stowed position, and a release position, in which the shelf can be moved between the second stowed position and the second deployed position.

9. The system of claim 1, further comprising lateral support arms moveably coupled to the shelf and the mounting frame.

10. The system of claim 1, wherein the mounting frame comprises:

a cover shroud at a lower end; and a bumper including one or more resilient stops between the cover shroud and the shelf.

11. A method for a system for restraining a galley cart within an internal cabin of a vehicle, the system comprising:

a mounting frame secured to a wall within the internal cabin; and a cart restrainer moveably coupled to the mounting frame, wherein the cart restrainer is configured to be moved between a first stowed position against one or both of the wall or the mounting frame, and a first deployed position that is configured to restrain the galley cart against one or both of the wall or the mounting frame, wherein the cart restrainer comprises:

a first arm pivotally coupled to the mounting frame at a first root;

a second arm pivotally coupled to the mounting frame at a second root, wherein the second arm is spaced apart from the first arm; and a cross bar connecting the first arm and the second arm, wherein the cross bar is distally located from the first root and the second root; and a shelf pivotally coupled to the mounting frame, wherein the shelf is configured to be moved between a second stowed position against one or both of the wall or the mounting frame, and a second deployed position that is configured to allow items to be supported on the shelf, wherein the shelf comprises:

a main body having a first surface, a first end, and a second end opposite from the first end, wherein the second end is pivotally coupled to the mounting frame;

cart holding arms pivotally coupled to the first surface at the first end, wherein the cart holding arms are moveable between a third stowed position and a third deployed position; and holding paddles pivotally coupled to the main body to the first surface at the second end, wherein the holding paddles are moveable between a fourth stowed position and a fourth deployed position, wherein a top portion of galley cart is configured to be restrained between the cart holding arms in the third deployed position and the holding paddles in the fourth deployed position when the shelf is in the second deployed position, the method comprising:

moving the cart restrainer between the first stowed position against one or both of the wall or the mounting frame, and the first deployed position that is configured to restrain the galley cart against one or both of the wall or the mounting frame.

12. The method of claim 11, further comprising moving the shelf between the second stowed position against one or both of the wall or the mounting frame, and the second deployed position that is configured to allow items to be supported on the shelf.

13. The system of claim 1, wherein the cross bar includes a first channel formed in a second surface, wherein the first channel is configured to receive first holding ends of first restraining clips pivotally secured to a top plate of the mounting frame.

14. The system of claim 13, wherein the shelf includes a second channel formed in a second surface proximate to the top plate of the mounting frame when the shelf is in the second stowed position, wherein the second channel is configured to receive second holding ends of second restraining clips pivotally secured to the top plate of the mounting frame.

15. The system of claim 1, wherein the cart holding arms and the holding paddles are mechanically linked to move together.

16. An aircraft comprising:

an internal cabin;

a monument within the internal cabin, wherein the monument comprises a wall, and wherein the wall faces a cross-aisle within the internal cabin;

a flight attendant seat secured to the wall; and a system for restraining a galley cart within the internal cabin of a vehicle, the system comprising:

a mounting frame configured to be secured to a wall within the internal cabin;

a cart restrainer moveably coupled to the mounting frame, wherein the cart restrainer is configured to be moved between a first stowed position against one or both of the wall or the mounting frame, and a first deployed position that is configured to restrain the galley cart against one or both of the wall or the mounting frame, wherein the cart restrainer comprises:

a first arm pivotally coupled to the mounting frame at a first root;

a second arm pivotally coupled to the mounting frame at a second root, wherein the second arm is spaced apart from the first arm; and a cross bar connecting the first arm and the second arm, wherein the cross bar is distally located from the first root and the second root; and a shelf pivotally coupled to the mounting frame, wherein the shelf is configured to be moved between a second stowed position against one or both of the wall or the mounting frame, and a second deployed position that is configured to allow items to be supported on the shelf, wherein the shelf comprises:

a main body having a first surface, a first end, and a second end opposite from the first end, wherein the second end is pivotally coupled to the mounting frame;

cart holding arms pivotally coupled to the first surface at the first end, wherein the cart holding arms are moveable between a third stowed position and a third deployed position; and holding paddles pivotally coupled to the main body to the first surface at the second end, wherein the holding paddles are moveable between a fourth stowed position and a fourth deployed position, wherein a top portion of galley cart is configured to be restrained between the cart holding arms in the third deployed position and the holding paddles in the fourth deployed position when the shelf is in the second deployed position.

17. The aircraft of claim 16, wherein the mounting frame comprises:

one or more first restraining clips moveable between a first restraining position, in which the first restraining clips restrain the cart restrainer in the first stowed position, and a first release position, in which the cart restrainer can be moved between the first stowed position and the first deployed position; and one or more second restraining clips moveable between a second restraining position, in which the second restraining clips restrain the shelf in the second stowed position, and a second release position, in which the shelf can be moved between the second stowed position and the second deployed position.

18. The aircraft of claim 16, wherein the cross bar includes a first channel formed in a second surface, wherein the first channel is configured to receive first holding ends of first restraining clips pivotally secured to a top plate of the mounting frame.

19. The aircraft of claim 18, wherein the shelf includes a second channel formed in a second surface proximate to the top plate of the mounting frame when the shelf is in the second stowed position, wherein the second channel is configured to receive second holding ends of second restraining clips pivotally secured to the top plate of the mounting frame.

20. The aircraft of claim 18, wherein the cart holding arms and the holding paddles are mechanically linked to move together.

* * * * *